W. V. TURNER.
TRIPLE VALVE DEVICE.
APPLICATION FILED AUG. 27, 1910.
1,053,247.
Patented Feb. 18, 1913.
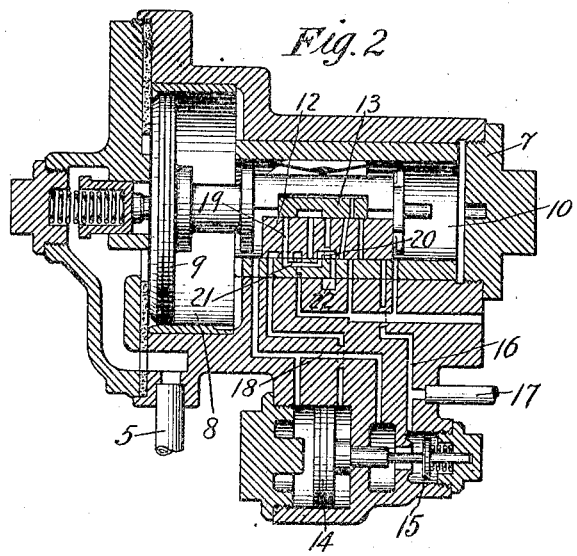
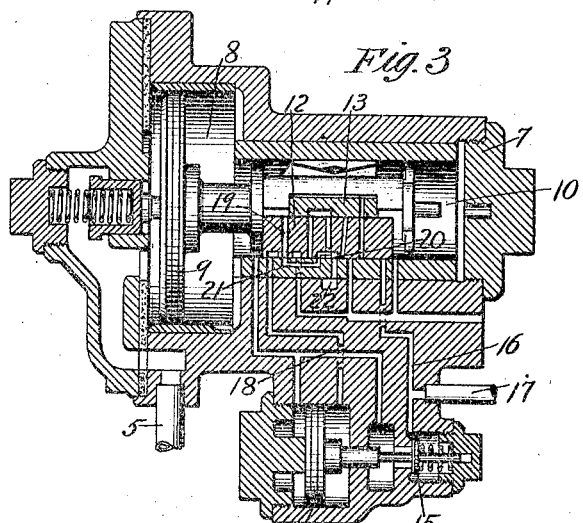
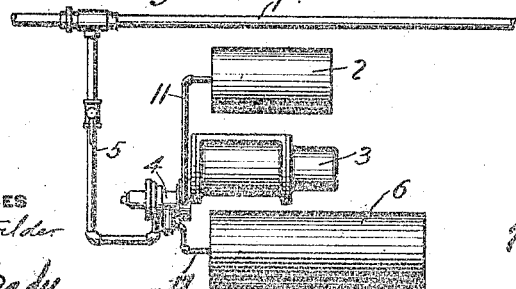
WITNESSES
INVENTOR
Walter V. Turner
by E. Wright
Att'y

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

TRIPLE-VALVE DEVICE.

1,053,247.   Specification of Letters Patent.   Patented Feb. 18, 1913.

Application filed August 27, 1910. Serial No. 579,297.

*To all whom it may concern:*

Be it known that I, WALTER V. TURNER, a citizen of the United States, residing at Edgewood, in the county of Allegheny and State of Pennsylvania, have invented new and useful Improvements in Triple-Valve Devices, of which the following is a specification.

This invention relates to fluid pressure brakes, and more particularly to a triple valve device having means operating upon an emergency application of the brakes to supply air to the brake cylinder from an additional source of fluid under pressure, in order to obtain a high degree of pressure in the brake cylinder. The higher equalizing degree of pressure thus obtained in the auxiliary reservoir, with apparatus of the above character, makes the differential of pressure in the train pipe available for releasing the brakes correspondingly less and sometimes this differential is hardly sufficient to insure the full movement of the triple valve parts to release position, especially if the main slide valve of the triple happens to stick or is sluggish in its movement. While a greater differential of pressures may be obtained by increasing the train pipe in excess of the standard pressure normally carried, for well known reasons, this is undesirable.

The principal object of my invention is to provide means, in connection with a triple valve device of the above type, for insuring and facilitating the prompt movement of the triple valve parts to release position after an emergency application of the brakes.

In the accompanying drawing, Figure 1 is a diagrammatic view of a car air brake equipment with my improvement applied thereto; Fig. 2 a central sectional view of a triple valve device embodying my invention, showing the parts in emergency application position; and Fig. 3 a similar view, showing the parts in the position assumed by the triple valve piston when the lost motion between the main slide valve and the graduating valve has been taken up.

As shown in Fig. 1, the brake equipment may comprise a train pipe 1, auxiliary reservoir 2, brake cylinder 3, triple valve device 4 connected to the train pipe 1 by branch pipe 5, and an additional source of fluid pressure, such as the supplemental reservoir 6.

The triple valve employed may be of any desired construction, that shown in Figs. 2 and 3 comprising the usual casing 7 having a piston chamber 8 containing piston 9, and valve chamber 10, connected by pipe 11 to the auxiliary reservoir 2 and containing the main slide valve 12 and the graduating valve 13 mounted on the main slide valve and having a movement relative thereto. The high pressure supply may be controlled by a piston 14 and a valve 15 operated by the piston in an emergency application to establish communication from passage 16 opening into the supplemental reservoir pipe 17, to a passage 18 which is open to the auxiliary reservoir in the emergency application position of the main slide valve 12, so that the brake cylinder, auxiliary reservoir and additional source of fluid pressure all equalize, as will be evident. According to my invention, in addition to the usual ports and cavities, a through port 19 and a cavity 20 are provided in the main slide valve 12 and a cavity 21 is provided in the main slide valve seat. As shown in Fig. 2, in emergency position, the port 19 registers with cavity 21 and cavity 21 is in communication with cavity 20. An exhaust port 22 registers with cavity 20. With piston 9 seated on the emergency gasket, the port 19 is closed by the graduating valve 13, but upon increasing the train pipe pressure to release the brakes, the triple valve piston and the graduating valve are moved to the position shown in Fig. 3, in which the port 19 is uncovered. Air is then vented from the auxiliary reservoir side of the triple valve piston and a sufficient differential between the train pipe and auxiliary reservoir pressures is thus secured to insure the prompt movement of the triple valve parts to release position.

It will be evident that my invention may be applied to various other types of triple valves where the pressure on the auxiliary reservoir side of the triple valve piston is high after an emergency application of the brakes.

Having now described my invention, what I claim as new and desire to secure by Letters Patent, is:—

1. In a fluid pressure brake, the combination with a train pipe, brake cylinder, auxiliary reservoir, and a triple valve device operated upon a sudden reduction in train pipe pressure for effecting an emergency application of the brakes, of means controlled by the movement of the triple valve and adapted upon increasing the train pipe pressure to release the brakes, to vent air from the auxiliary reservoir to the atmosphere, and thereby facilitate the release of the brakes.

2. In a fluid pressure brake, the combination with a train pipe, brake cylinder, and auxiliary reservoir, of a triple valve device comprising valve means and a piston subject to the opposing pressures of the auxiliary reservoir and train pipe and operated by a sudden reduction in train pipe pressure for effecting an emergency application of the brakes and means controlled by said valve means and adapted upon increasing the train pipe pressure to release the brakes after an emergency application to vent air from the auxiliary reservoir to the atmosphere to assist the release of the brakes.

3. In a fluid pressure brake, the combination with a train pipe, brake cylinder, auxiliary reservoir, and triple valve device operating upon a sudden reduction in train pipe pressure for effecting an emergency application of the brakes, of means operating upon the initial movement of the triple valve device from emergency position in releasing the brakes to vent air from the auxiliary reservoir.

4. In a fluid pressure brake, the combination with a train pipe, brake cylinder, and auxiliary reservoir, of a triple valve device comprising valve means for controlling the supply and release of air to and from the brake cylinder, a piston subject to the opposing pressures of the train pipe and auxiliary reservoir for operating said valve means, and means adapted to vent air from the auxiliary reservoir upon the initial movement of said piston in releasing the brakes after a brake application.

5. A triple valve device comprising a piston subject to the opposing pressures of the train pipe and auxiliary reservoir, a main valve and a graduating valve operated by said piston, the graduating valve having a movement relative to the main valve, and a port controlled by the preliminary movement of the graduating valve and piston from emergency position for venting air from the auxiliary reservoir, to facilitate the release of the brakes.

6. A triple valve device adapted upon a sudden reduction in train pipe pressure for effecting an emergency application of the brakes, comprising a piston subject to the opposing pressures of the train pipe and auxiliary reservoir, a main valve and a graduating valve having a movement relative to the main valve and operated by the preliminary movement of the piston from emergency application position to open a port for venting air from the auxiliary reservoir side of the triple valve piston to thereby assist the release of the brakes.

7. In a fluid pressure brake, the combination with a train pipe, auxiliary reservoir, and brake cylinder, of an additional source of fluid pressure, a triple valve device operated upon a sudden reduction in train pipe pressure for supplying air from said additional source of fluid pressure and from the auxiliary reservoir to the brake cylinder, and means for venting air from the auxiliary reservoir side of the triple valve device in releasing the brakes after an emergency application to facilitate the release of the brakes.

In testimony whereof I have hereunto set my hand.

WALTER V. TURNER.

Witnesses:
WM. M. CADY,
A. M. CLEMENTS.